(12) United States Patent
Fujita et al.

(10) Patent No.: US 6,557,034 B1
(45) Date of Patent: Apr. 29, 2003

(54) COMMUNICATION CONTROL DEVICE TRANSMITTING DATA BASED ON INTERNAL BUS SPEED OF RECEIVING COMPUTER

(75) Inventors: Hirofumi Fujita, Yokohama (JP); Hideki Murayama, Yokohama (JP); Hiroshi Yashiro, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/497,535

(22) Filed: Feb. 3, 2000

(30) Foreign Application Priority Data

Feb. 3, 1999 (JP) .............................. 11-026670

(51) Int. Cl.⁷ .............................................. G06F 13/00
(52) U.S. Cl. ...................... 709/223; 709/230; 709/232; 709/233
(58) Field of Search ................. 709/223, 230, 709/232, 233

(56) References Cited

U.S. PATENT DOCUMENTS 4,365,296 A * 12/1982 Ulmer ........................ 709/232
5,623,607 A * 4/1997 Kodama et al. ............... 710/29

* cited by examiner

*Primary Examiner*—David Wiley
*Assistant Examiner*—Joseph E Avellino
(74) *Attorney, Agent, or Firm*—Townsend and Townsend and Crew LLP

(57) ABSTRACT

Before transferring data, a transmitting computer acquires a transfer rate of an I/O bus to which a communication control device in a receiving computer is connected. When transmitting data, the communication control device refers to a connection control table and a receiver control table, and chooses a transmitting queue for data transmission from a plurality of transmitting queues so that an interval is inserted between transmissions of data, and the data can be transmitted to the receiving computer without loss. The transmission intervals of data are determined based on the transfer rate of the I/O bus to which the communication control device in the receiving computer is connected.

6 Claims, 18 Drawing Sheets

| RECEIVER IDENTIFIER | REMOTE I/O BUS SPEED | NEXT TRANSMITTABLE TIME |
|---|---|---|
| 1 | 2112 | 1003 |
| 2 | 1056 | 1001 |
| 3 | 4224 | 1005 |

| CONNECTION NUMBER (601) | RECEIVER IDENTIFIER (602) | QUEUE LENGTH (603) |
|---|---|---|
| 1 | 1 | 0 |
| 2 | 2 | 0 |
| 3 | 3 | 2 |
| 4 | 2 | 3 |
| 5 | 2 | 1 |

| RECEIVER IDENTIFIER (701) | REMOTE I/O BUS SPEED (702) | NEXT TRANSMITTABLE TIME (703) |
|---|---|---|
| 1 | 2112 | 1003 |
| 2 | 1056 | 1001 |
| 3 | 4224 | 1005 |

| NETWORK ADDRESS OF RECEIVER (241) | NETWORK ADDRESS OF SENDER (242) | SENDER IDENTIFIER (243) | I/O BUS SPEED OF SENDER (244) | OTHER INFORMATION (245) |
|---|---|---|---|---|

MINIMUM TRANSMISSION INTERVAL = MAXIMUM DIFFERENCE BETWEEN RECEIVING TIME AND TRANSMITTING TIME

= RECEIVING TIME FOR MAXIMUM DATA − TRANSMITTING TIME FOR MAXIMUM DATA $$= \frac{\text{MAX DATA LENGTH}}{\text{REMOTE I/O BUS SPEED}} - \frac{\text{MAX DATA LENGTH}}{\text{LOCAL I/O BUS SPEED}}$$

$$= \text{MAX DATA LENGTH} \times \left( \frac{1}{\text{REMOTE I/O BUS SPEED}} - \frac{1}{\text{LOCAL I/O BUS SPEED}} \right)$$

NEXT TRANSMITTABLE TIME = CURRENT TIME + MIN TRANSMISSION INTERVAL

| RECEIVER IDENTIFIER | MINIMUM TRANSMISSION INTERVAL | NEXT TRANSMITTABLE TIME |
|---|---|---|
| 1 | 0 | 1003 |
| 2 | 5 | 1001 |
| 3 | 3 | 1005 |

FIG.18

MULTIPLIER = TIME REQUIRED FOR RECEIVING 1 BIT
  − TIME REQUIRED FOR RECEIVING 1 BIT $$= \frac{1}{\text{REMOTE I/O BUS SPEED}} - \frac{1}{\text{LOCAL I/O BUS SPEED}}$$

NEXT TRANSMITTABLE TIME = CURRENT TIME + (DATA LENGTH × MULTIPLIER)

FIG.19

| CONECTION NUMBER (601) | NEXT CONECTION (624) | RECEIVER IDENTIFIER (602) | QUEUE LENGTH (603) |
|---|---|---|---|
| 1 | END | 1 | 0 |
| 2 | 5 | 2 | 0 |
| 3 | END | 3 | 2 |
| 4 | END | 2 | 3 |
| 5 | 4 | 2 | 1 |

| RECEIVER IDENTIFIER (701) | REMOTE I/O BUS SPEED (702) | NEXT TRANSMITTABLE TIME (703) | NEXT CONNECTION (724) |
|---|---|---|---|
| 1 | 2112 | 1003 | 1 |
| 2 | 1056 | 1001 | 2 |
| 3 | 4224 | 1005 | 3 |

720

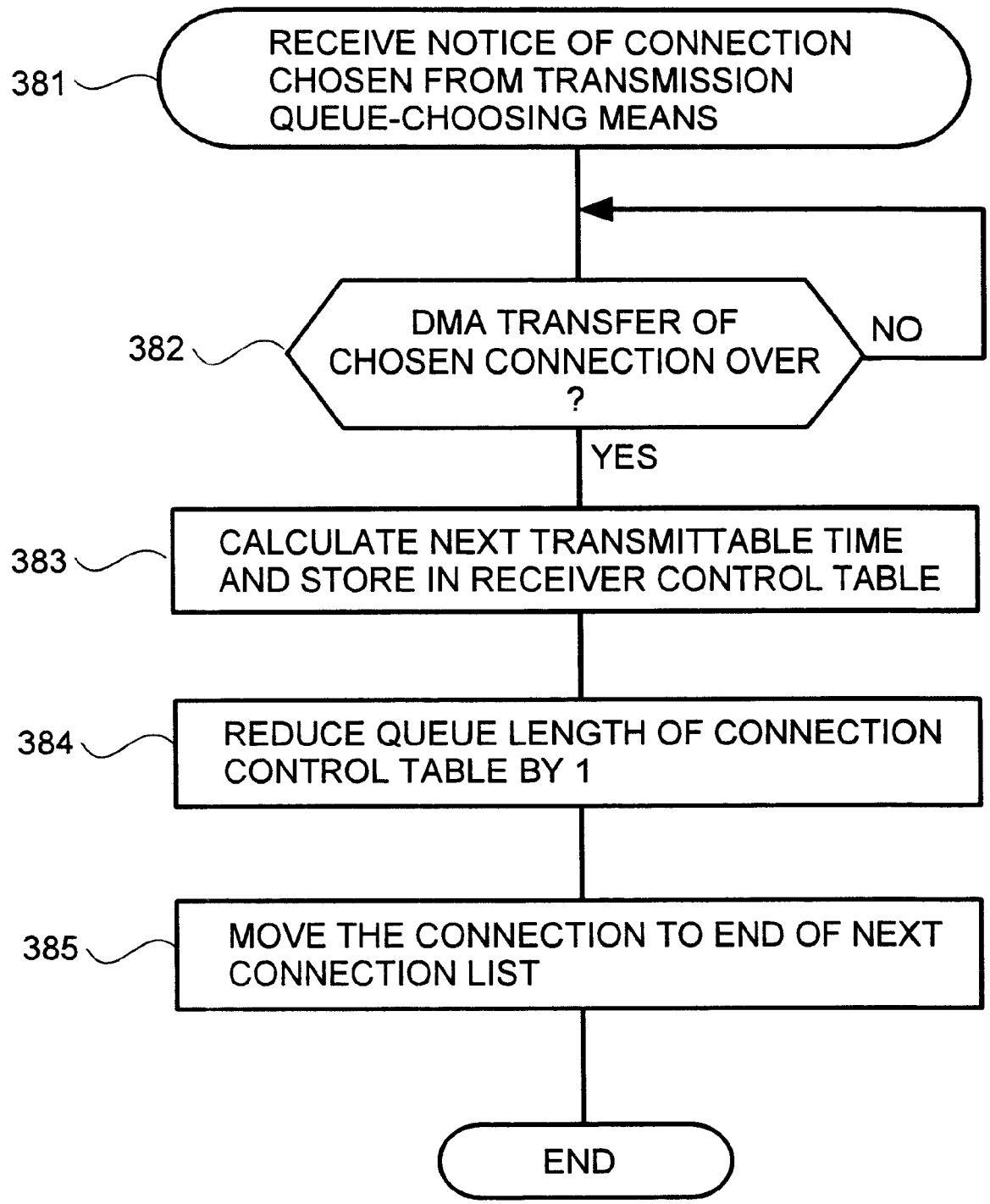

COMMUNICATION CONTROL DEVICE TRANSMITTING DATA BASED ON INTERNAL BUS SPEED OF RECEIVING COMPUTER

BACKGROUND OF THE INVENTION

This invention relates to a communication control devices. More specifically, this invention relates to a communication control device for transferring data among devices such as computers and other communication control devices whose internal buses, such as I/O buses, differ in transfer speed.

Data packets sent out from a transmitting computer are received by a receiving computer through a network. Before sending out such data, the transmitting computer processes the data through a protocol and adds control data, to produce packets. The packets are sent to a network adapter through internal buses (a host bus and an I/O bus) of the transmitting computer and sent out to the network. The packets arrived at a network adapter corresponding to the receiving computer are stored into the memory of the receiving computer via the internal buses such as the I/O bus and the host bus of the receiving computer. Thereafter, the receiving computer processes the data packets in various ways, for example, to extract the data.

To perform communication efficiently between computers, sometimes data packets are sent continuously without an interval between packets. In this case, if data packets are sent out at a speed beyond the capacity of a receiving computer, the receiving computer fails to receive the packets and the data are lost. To prevent such loss of data, it is necessary for a transmitting computer to control its transfer rate. A computer's processing capacity of received data is mainly determined by the transfer rates of its internal buses, the processing speed of its processor, and the speed of writing data into and reading data from its memory.

In the case of the TCP (Transmission Control Protocol) which is commonly used in the Internet, the transferable data quantity of a transmitting computer is determined based on the available data butter capacity of a receiving computer. With the technique of our invention, data loss due to the shortage of available buffer capacity in a receiving computer can be prevented.

Because the transfer rates of internal buses such as I/O buses and host buses of computers have been higher than the data transfer rates of networks (network transfer rates), the former rates have not usually affected the communication efficiency of such networks. In recent years, however, the communication speeds of networks are increasing, and many networks have communication speeds higher than the transfer rates of internal buses of computers. In a network, if the transfer rate of internal buses of a receiving computer is lower than that of a transmitting computer, the capacity of the receiving computer for storing the data arrived at its corresponding network adapter into its memory through its internal buses can be a bottleneck of the data transfer among the computers through such a network.

In the case of the method of determining the transferable data quantity based on the available data buffer capacity of a receiving computer, if a transmitting computer sends Out data continuously, next data may arrive at the network adapter of a receiving computer before it finishes storing the previous data arrived at the adapter into its memory through its internal buses. If it happens, the receiving computer fails to receive data and they are lost. Lost data have to be resent, which reduces the communication efficiency between computers through networks.

SUMMARY OF THE INVENTION

This invention provides a communication control device which prevents data loss caused by failure in receiving data on the reception side. It thereby enables high communication efficiency among devices such as computers and communication control devices with internal buses having different transfer rates and processing speed.

In a first embodiment, a communication control device includes a connection control table which holds connection data for communication between the communication control device and other communication control devices on the reception side and identifiers of the other communication control devices, and a receiver control table which holds data including the identifiers, the internal bus speeds of the other communication control devices, and next transmittable times. It also includes a connection control means which, upon the establishment of a connection with one of the other communication control devices, receives, from the communication control device on the reception side, a connection establishment response which includes the internal bus speed of the communication control device, and a table control means which receives a notice of establishment of a connection from the connection control means, records data in the connection control table, and records the data including the internal bus speed received by the connection control means into the receiver control table if the receiver control table has no data corresponding to the identifier of the communication control device. Finally, the device includes a transmitting queue-choosing means which chooses the connection number and the receiver identifier of the next connection from the connection control table made by the table control means, acquires the next transmittable time for the chosen receiver identifier from the receiver control table made by the table control means, compares the next transmittable time and the current time, and chooses a transmitting queue for storing data to be transmitted in accordance with the result of the comparison.

According to a second embodiment of the invention, the communication control device includes (i) a means for retaining the transfer rate of the I/O bus to which the communication control device is connected, (ii) a means for choosing one transmitting queue for transmission of data from a number of transmitting queues, (iii) a memory for storing a connection control table holding corresponding relation between combinations of transmitting and receiving queues, each combination consisting of a transmitting queue and a receiving queue, and other communication control devices and (iv) a memory for storing a receiver control table which holds the transfer rates of the I/O buses to which the other communication control devices are connected and other data of the other communication control devices. The communication control device is used in a computer system where the processor and the memory are connected to a host bus, the communication control device is connected to an I/O bus, a bus bridge is provided between the host bus and the I/O bus, and data are transferred between the communication control device and the memory by transferring the data between the I/O bus and the host bus through the bus bridge. The device also includes a plurality of transmitting queues for storing data to be transmitted and a plurality of receiving queues for storing received data; the data stored in a transmitting queue can be transmitted to a receiving queue of any receiving computer, and a means is provided for specifying the combinations of transmitting and receiving queues uniquely.

In a third embodiment of the invention, a communication control device comprising (i) a means for renewing the connection control table and the receiver control table and (ii) a means for making and deleting combinations of transmitting queues and receiving queues.

In a fourth embodiment, by choosing a transmitting queue for data transmission based on the transfer rate of the I/O bus to which another communication control device is connected on the reception side, an interval is inserted between data packets as they are sent.

In a further embodiment, by choosing a transmitting queue for data transmission based on the transfer rate of the I/O bus to which another communication control device is connected on the reception side, an interval is inserted between the transmission of a data packet and the transmission of the next data packet, with the interval being determined by the length of the former packet.

BRIEF DESCRIPTION OF THE DRAWINGS

A preferred form of the present invention is illustrated in the accompanying drawings in which:

FIG. 4 is an illustration showing an example of the connection control table;

FIG. 5 is an illustration showing an example of the receiver control table;

FIG. 6 is an illustration showing an example of the connection establishment packet;

FIG. 15 shows an example of the method by which the table control means calculates the next transmittable time;

FIG. 18 is an illustration showing a method by which the table control means calculates the next transmittable time with data packets of different lengths to achieve high-efficiency communication;

FIG. 19 is an illustration showing another embodiment of connection control table of the present invention, which is designed for even choice of connections;

FIG. 20 is an illustration showing another embodiment of receiver control table of the present invention, which is designed for even choice of connections;

FIG. 24 is a flowchart showing the processing procedure for choosing connections evenly in the case when the table control means receives a notice of a connection chosen from the transmitting queue-choosing means.

DESCRIPTION OF THE SPECIFIC EMBODIMENTS

With reference to the drawings, a preferred embodiment of the present invention will now be described.

1. General Configuration and Operation of a Communication Control Device

Figure 1:
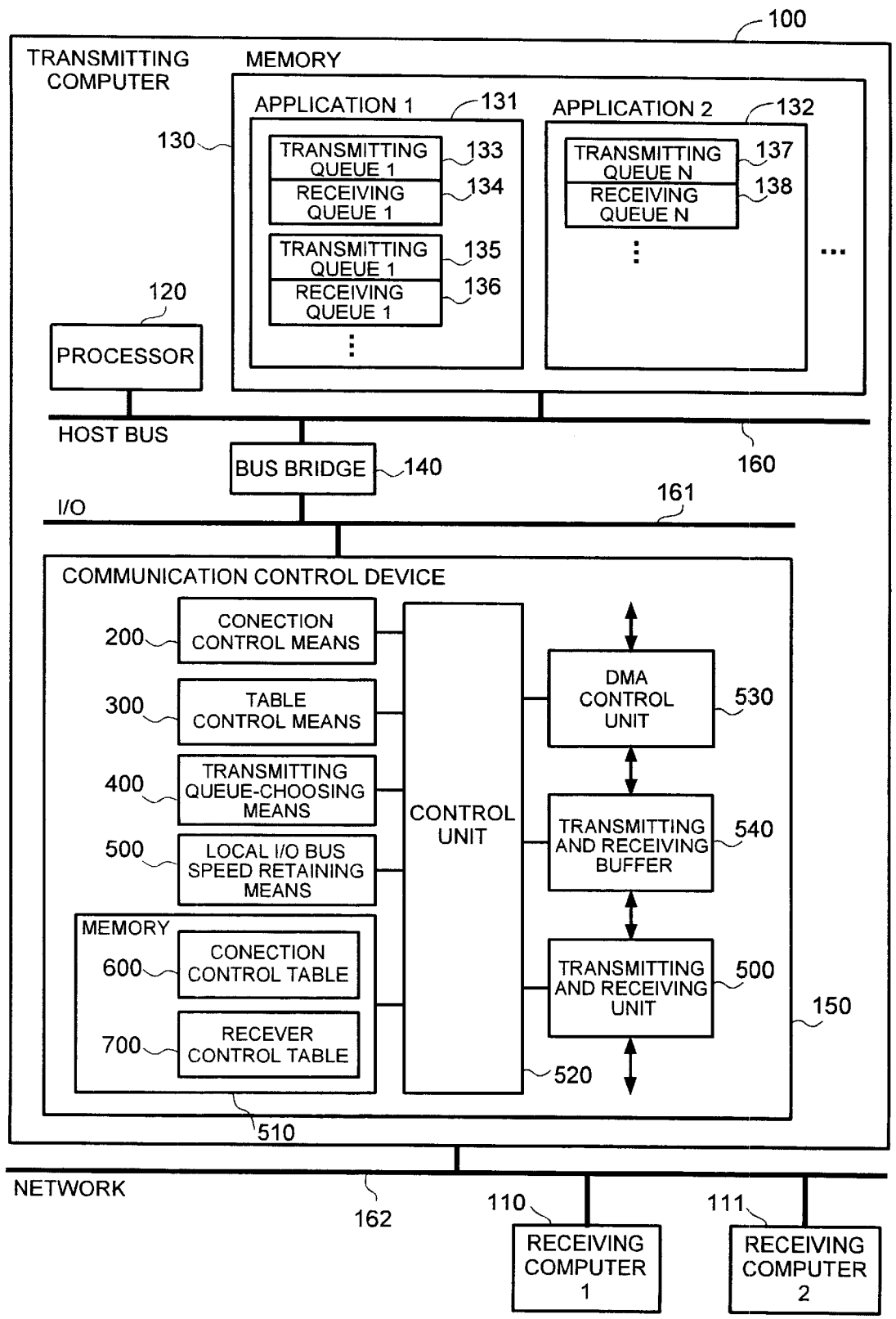
FIG. 1 is an illustration showing the general configuration of a communication system in accordance with the present invention.

FIG. 1 illustrates the general configuration of a communication system in accordance with the present invention. In FIG. 1, computers 100, 110, and 111 are connected to one another through a network 162. Taking the transmitting computer 100 as representative, the configuration of the computers will be described below.

In the computer 100, a processor 120 and a memory 130 are connected to a host bus 160. A communication control device 150 is connected to an I/O bus 161 in the computer 100 and also connected to an outside network 162. A bus bridge 140 is provided between the host bus 160 and the I/O bus 161. The bus bridge 140 relays data between the host bus 160 and the I/O bus 161. The transfer of data between the communication control device 150 and the memory 130 is made by transferring the data between the I/O bus 161 and the host bus 160 through the bus bridge 140. The receiving computers 110 and 111 have the same configuration as the transmitting computer 100.

The memory 130 stores instruction sequences such as application programs 131, 132 for communication, and data. The application programs 131 and 132 retain transmitting queues 133, 135, 137, etc. for storing data to be transmitted and receiving queues 134, 136, 138, etc. for storing received data. For two computers to communicate with each other, they make a connection between them before transferring data. A connection is a combination of a transmitting queue and a receiving queue in the two computers, which enables delivery (transmit and store) of the data stored in the transmitting queue of a computer in the receiving queue of the other computer. In a computer, a connection includes a pair of transmission and receiving queues. In the case of the transmitting computer 100, the transmitting queue 133 and the receiving queue 134, the transmitting queue 135 and the receiving queue 136, and the transmitting queue 137 and the receiving queue 138 correspond to connections. An application program has a connection, or two or more connections. Two computers communicate with each other by delivering the data stored in the transmitting queue of a computer to the receiving queue of the other computer.

The memory 510 in the communication control device 150 has a connection control table 600 and a receiver control table 700. The connection control table 600 is, for example, a table indicating the corresponding relations between connections and communication control devices (or computers) on the reception side. A connection, or two or more connections are provided for a communication control device (or computer) on the reception side. The receiver control table 700 is, for example, a table which stores the transfer rate of the I/O bus which each communication control device (or computer) is connected to on the reception side and the time when data can be transmitted to the communication control device. For this embodiment, described below is a case where the bottleneck of the transfer rate is the I/O buses. If buses other than the I/O buses constitute a bottleneck of the transfer rate, their transfer rates may be recorded in the receiver control table 700. Although the connection control table 600 and the table control means 700 are stored in the memory 510 of the communication control device 150, they may be stored in the memory 130 or other memories of the computer 100.

A connection control means 200 makes and deletes connections in the connection control table 600. A table control means 300 renews the connection control table 600 and the receiver control table 700. A transmission queue-choosing means 400 chooses one among the transmitting queues in the memory 130. An I/O bus speed-retaining means 500 retains the transfer rate of the I/O bus 161 which the communication control device 150 is connected to. Although the connection control means 200, the table control means 300, the transmitting queue-choosing means 400, and the I/O bus speed-retaining means 500 are included in the communication control device 150, they may be included, as instruction sequences and data, in the memory 130 or other units in the computer 100.

A DMA control unit 530 transfers data between the memory 130 and a transmitting and receiving buffer 540. The DMA control unit 530 may transfer data directly to and from the I/O bus 161, or via a control unit 520, or otherwise. The transmitting and receiving buffer 540 stores data to be transmitted and received data temporarily. A transmitting and receiving unit 550 takes data from the transmitting and receiving buffer 540, makes packets, and sends them out to the network 162, or receives packets from the network 162, extracts data from the packets, and stores the data in the transmitting and receiving buffer 540. The transmitting and receiving unit 550 may send and receive data directly to and from the network 162, or via the control unit 520, or otherwise. The control unit 520 takes data from the units in the communication control device, makes records, and manages the operation of the units. The control unit 520 also controls the operation of the above units in accordance with programs stored in it.

Figure 2:
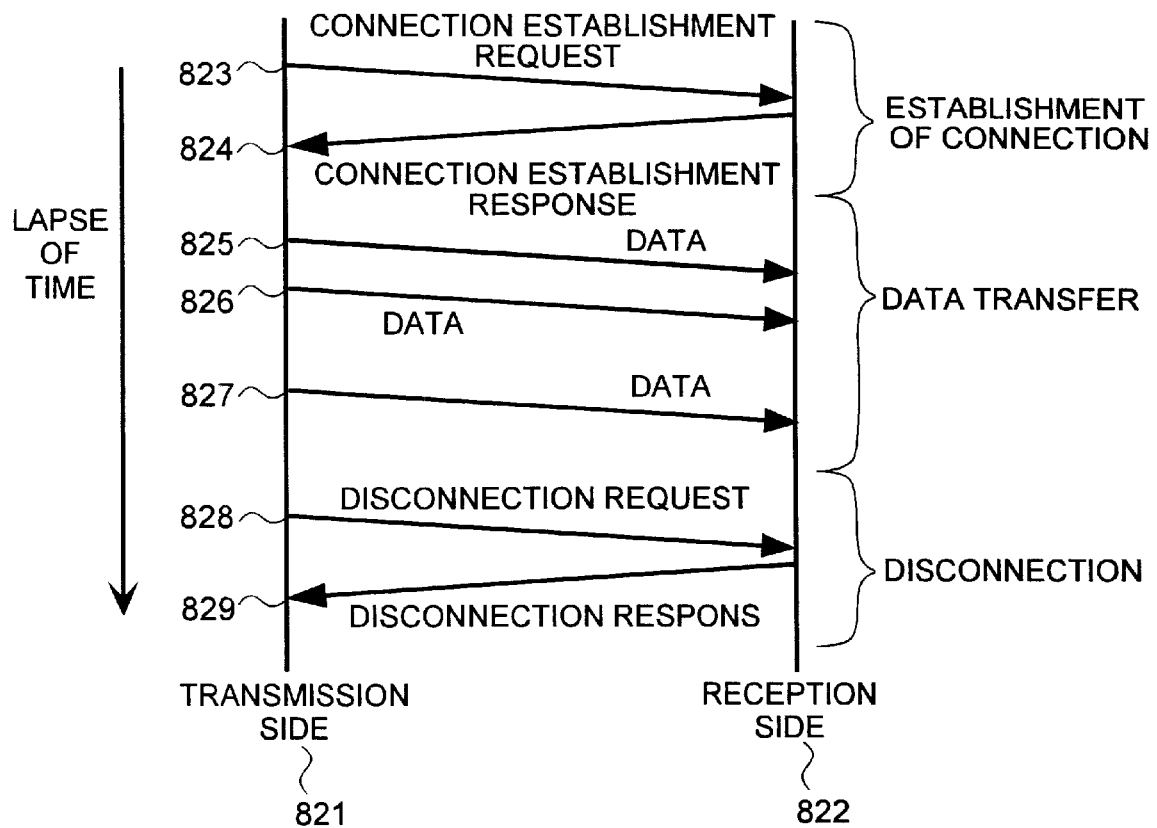
FIG. 2 is an illustration showing a mode of transmitting and receiving packets between a transmitting computer and a receiving one.

Next a common mode of transmitting and receiving packets will be described in relation to the present invention. FIG. 2 illustrates a mode of transmitting and receiving packets between a transmitting computer and a receiving one. The communication between a computer on the transmission side 821 and a computer on the reception side 822 comprises the three steps of establishing a connection, transferring data, and breaking the connection. Establishing a connection means making a connection between two computers. Connection-establishing packets mean packets to be exchanged between two computers to establish a connection between them. Breaking a connection means deleting a connection made between two computers. Connection-breaking packets mean packets to be exchanged between two computers to cut the connection between them.

In the step of establishing a connection, the transmitting computer 821 sends a packet for requesting the establishment of a connection (a connection-establishment request packet) 823 to the receiving computer 822. Upon the receipt of the connection-establishment request packet 823, the receiving computer 822 sends a packet for approving the establishment of a connection (a connection-establishment response packet) 824 to the transmitting computer 821. The transmitting computer 821 receives the connection-establishment response packet 824. Thus, a connection is established between the transmitting computer 821 and the receiving computer 822, and a pair of transmitting and receiving queues is made in each computer.

In the step of transferring data, the transmitting computer 821 sends data packets 825, 826, 827, etc. to the receiving computer 822. The receiving computer 822 may sends the transmitting computer 821 a packet confirming the receipt of the data packets.

In the step of breaking the connection, the transmitting computer 821 sends a packet for requesting disconnection (a disconnection request packet) 828 to the receiving computer 822. Upon the receipt of the disconnection request packet 828, the receiving computer 822 sends a packet approving the disconnection (a disconnection response packet) 829 to the transmitting computer 821. The transmitting computer 821 receives the disconnection response packet 829. Thus, the connection between the transmitting and receiving computers 821 and 822 is broken, and the pair of transmitting and receiving queues in each computer is deleted.

In the above steps of establishing a connection, transferring data, and breaking the connection, the relation between the transmitting and receiving computers 821 and 822 is reciprocal, and hence packets can be sent to either direction between them. In other words, the receiving computer 822 can send a connection-establishment request packet, data packets, and a disconnection request packet to the transmitting computer 821.

Referring to FIG. 1 again, the operation of the communication control device in accordance with the present invention will now be described. Although an example of data transmission based on the transfer rates of I/O buses will be described below, the present invention is not limited to such transmission. In the step of establishing a connection, each of the computers 100, 110, and 111 retains the transfer rate of its I/O bus 161 or the like to which a communication control device 150 or the like is connected. Each of the receiving computers 110 and 111 makes a combination of a transmitting queue and a receiving queue and notifies the communication control device 150 of the computer 100 of the transfer rate of its I/O bus which a communication control device is connected to. Thus, the communication control device 150 of the computer 100 acquires the transfer rates of the I/O buses, which the communication control devices are connected to of the receiving computers 110 and 111. The communication control device 150 has the connection control table 600 indicating the corresponding relation between the combinations of transmitting and receiving queues and the communication control devices on the reception side. A combination, or two or more combinations of transmitting and receiving queues are provided for a communication control device on the reception side. In addition, the communication control device 150 has receiver control table 700 storing the transfer rates of the I/O buses which the communication control devices on the reception side are connected to and times when data can be transmitted.

In the step of transferring data, the communication control device 150 determines which transmitting queue to use for transmitting data to a communication control device on the reception side. This determination may be made as follows. In the first place, the communication control device 150 chooses one among a number of transmitting queues. Then, referring to the connection control table 600, the communication control device 150 chooses the communication control device on the reception side corresponding to the chosen transmitting queue. Next, referring to the receiver control table 700, the communication control device 150 checks to see whether a prescribed time period has passed or not since the last transmission to the chosen communication control device on the reception side. This determination is made by acquiring the data-transmittable time from the receiver control table 700 and comparing the time with the current time. If the data-transmittable time is behind the current time, the prescribed time period has already passed since the last transmission. Accordingly, the chosen transmitting queue is determined to be the queue for data transmission. After transmitting data, the communication control device 150 adds the prescribed time period to the current time to find the next data-transmittable time and stores it in the receiver control table 700. If the current time is still behind the data-transmittable time, the prescribed time period has not yet passed after the last data transmission. In this case, another transmitting queue is chosen, and the above checking procedure is repeated. The above procedure of choice and checkup is repeated until an effective transmitting queue is found. Such a prescribed time period for data transmission is determined based on the transfer rate of the I/O bus to which a communication control device on the reception side is connected.

Figure 3:
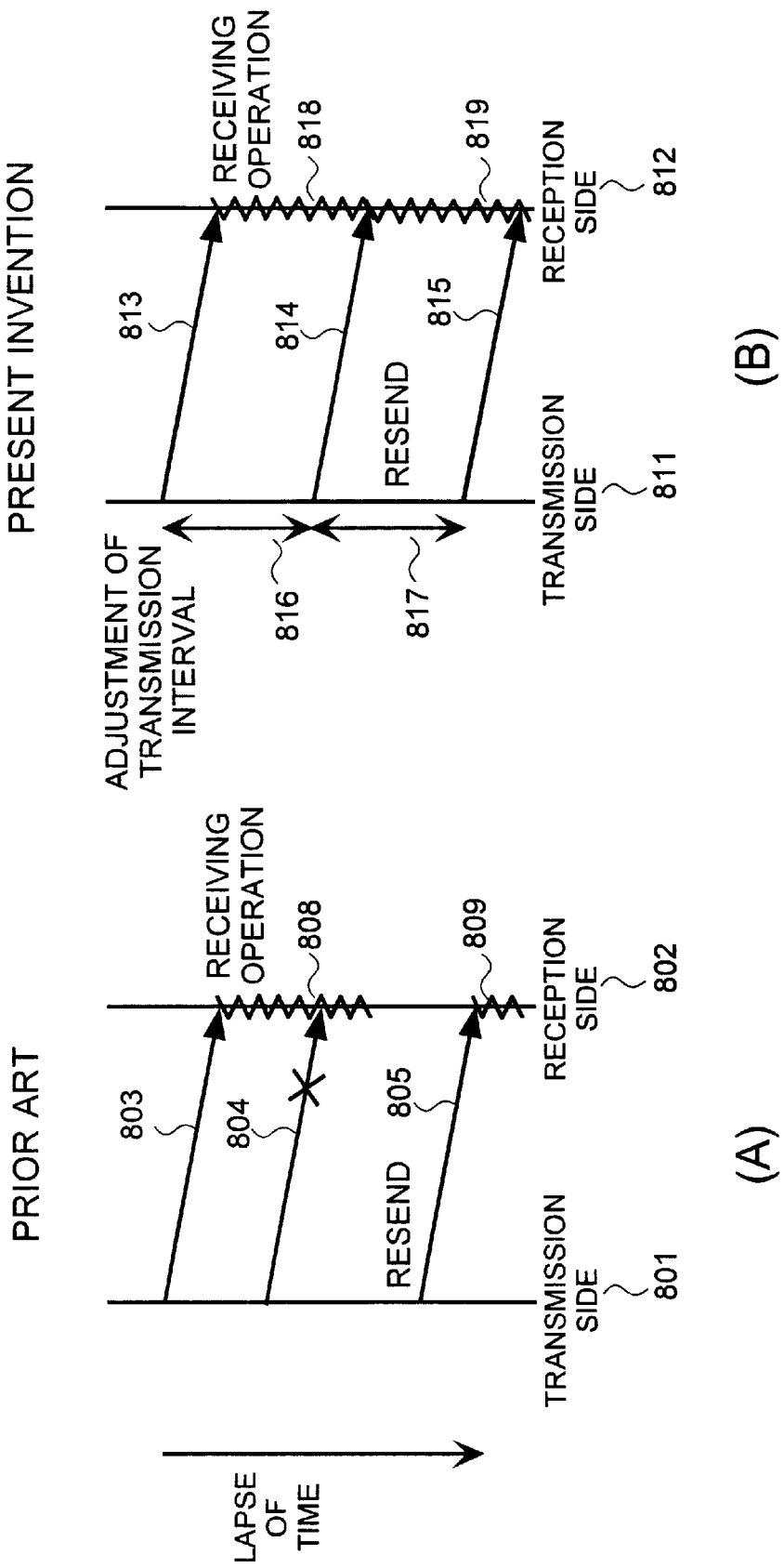
FIG. 3 illustrates, for comparison, the mode of transmitting and receiving data packets in accordance with a prior art and that in accordance with the present invention.

FIG. 3 illustrates, for comparison, the mode of transmitting and receiving data packets in accordance with prior art and in accordance with the present invention. In accordance with the prior art, as shown in FIG. 3(A), a transmitting computer 801 sends out data packets 803 and 804 continually. Accordingly, while a receiving computer 802 is processing 808 the received data packet 803, the next data packet 804 may arrive at the receiving computer 802. If this happens, the receiving computer 802 cannot receive the data packet 804, which is lost. The lost data have to be resent as another data packet 805 so that the receiving computer 802 can retrieve the lost data and process 809 them properly. In the case of the present invention, on the other hand, a transmitting computer 811 sends out data packets 813, 814, and 815 putting intervals 816 and 817 between them, as shown in FIG. 3(B). Therefore, a receiving computer 812 can first receive the data packet 813 and process 818 the received data packet 813. Then, the receiving computer 812 can receive the next data packet 814 and process 819 the received data packet 814.

As described above, by putting intervals between data packets while they are sent out from a transmitting computer, their processing at a receiving computer can be made secure: the receiving computer can receive the next data packet after its communication control device finishes processing and storing the previous data packet into the memory through the I/O bus. Accordingly, data loss due to failure on the reception side can be eliminated.

2. Detailed Operation of the Communication Control Device

The operation of the communication control device in accordance with the present invention is now described in detail. The connection control table 600, the receiver control table 700, and the connection establishment packet will be described first.

FIG. 4 shows an example of the connection control table 600 of a computer. The column of connection numbers 601 holds unique connection numbers established with other communication devices, computers, or the like. The column of receiver identifiers 602 holds values for identifying other communication control devices, computers, or the like, to which data are transmitted, uniquely in the whole communication system. The receiver identifier 602 may be the network address assigned to each communication control device, or the number assigned to each computer, or the combination of the computer number and the number of the I/O bus or the number of an internal bus which is the bottleneck of the communication. The column of queue length 603 holds the number of data stored in the transmitting queue corresponding to each connection. When the data of a transmitting queue is transmitted, the operating system, an application program, or the like enters the value of the queue length 603 of the transmitting queue into the column or renews the existing value in the column.

FIG. 5 shows an example of the receiver control table 700. The column of receiver identifiers 701 holds values for identifying other communication control devices, computers, or the like, to which data are transmitted, uniquely in the whole communication system (in the same way as the column of receiver identifiers 602 does in the connection control table 600 of FIG. 4). The column of I/O bus speeds 702 holds the transfer rates of the I/O buses to which communication control devices on the reception side are connected. The transfer rate of an I/O bus is the bit width of the I/O bus multiplied by the operating frequency. The column 702 shows, as examples, three rates of 2,112 (32 bits×66 MHz or 64 bits×33 MHz), 1,056 (32 bits×33 MHz), and 4,224 (64 bits×66 MHz). The column of next transmittable times 703 holds the next time when data can be transmitted to each communication control device on the reception side. The column shows examples in terms of a time period from a reference time.

FIG. 6 shows an example of the connection establishment packet. The section of receiver network address 241 of the connection establishment packet 240 holds the network address assigned to a communication control device, a computer, or the like to which the packet is transmitted. The section of transmitter network address 242 holds the network address assigned to a communication control device, a computer, or the like which sends out the packet. The section of transmitter identifier 243 holds the identifier for identifying a communication control device, a computer, or the like, which sends out the packet, uniquely in the whole communication system. Even if two or more communication control devices, computers, or the like are connected to internal buses such as I/O buses under one network address 242, the transmitter can be identified with the transmitter identifier 243. The section of transmitter I/O bus speed 244 holds the transfer rate of the I/O bus to which the communication control device is connected. The section other information 245 holds other information necessary for the establishment of a connection. For example, the number of data to be transmitted may be included in the section 245. By exchanging such connection establishment packets between two computers to establish a connection between them, each computer can acquire the transfer rate of the I/O bus of the other computer.

Figure 7:
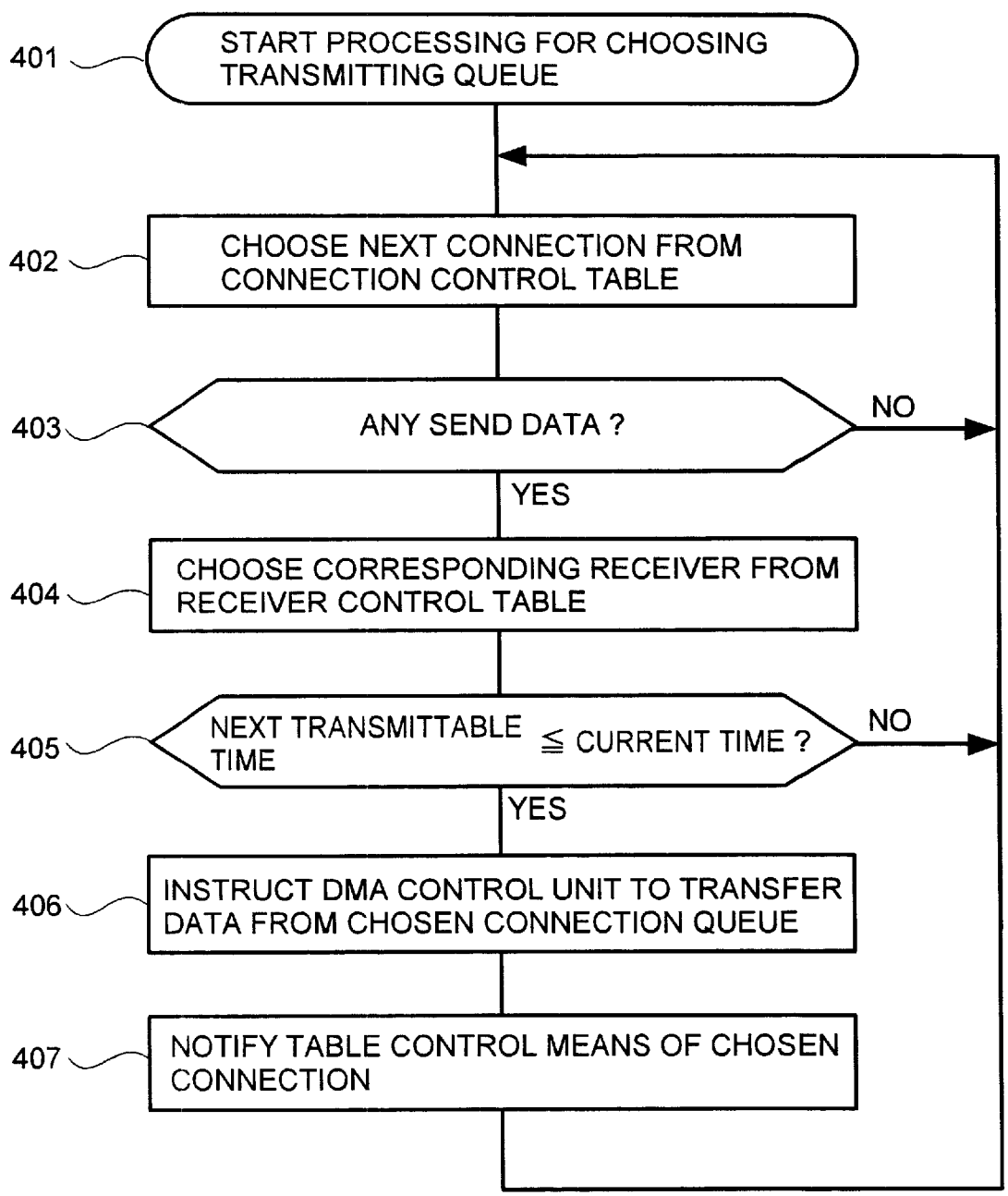
FIG. 7 is a flowchart showing the processing procedure of the transmitting queue-choosing means.

Now the operation of various components will be described with reference to flowcharts. FIG. 7 is a flowchart indicating the processing procedure of the transmitting queue-choosing means 400. After the communication control device 150 is turned on, the transmitting queue-choosing means 400 starts the processing for choosing a transmitting queue (Step 401). Referring to the connection control table 600, the transmitting queue-choosing means 400 chooses a connection (Step 402). The choice may be made as follows. If a connection is already chosen, the transmitting queue-choosing means 400 chooses the next connection in the connection control table 600. For example, if connection "1" is already chosen, the transmitting queue-choosing means 400 chooses connection "2." If the connection "5" is already chosen, the transmitting queue-choosing means 400 chooses the connection "1." If no connection is chosen, the transmitting queue-choosing means 400 chooses the first connection in the connection control table 600.

After choosing a connection, the transmitting queue-choosing means 400 checks to see whether the transmitting queue corresponding to the chosen connection has data or not (Step 403). It can be accomplished, for example, by checking the queue length 603 to see whether its value is zero or not. If the transmitting queue has no data, the transmitting queue-choosing means 400 returns to Step 402 and chooses the next connection. If the transmitting queue has data, the transmitting queue-choosing means 400 refers to the receiver control table 700 through the receiver identifier 602 to find out the receiver corresponding to the chosen connection (Step 404).

Then the transmitting queue-choosing means 400 acquires the next transmittable time 703 in the row of the chosen receiver and checks to see whether the current time has passed the next transmittable time or not (Step 405). If the current time has not reached the next transmittable time yet, the transmitting queue-choosing means 400 determines that the data cannot be transmitted to the chosen receiver and returns to Step 402 to chooses the next transmitting queue. If the current time has passed the next transmittable time, the transmitting queue-choosing means 400 instructs the DMA control unit 530 to transfer data from the transmitting queue of the chosen connection (Step 406). The transmitting queue-choosing means 400 notifies the table control means 300 of the chosen connection (Step 407) and returns to Step 402 to choose the next connection. The table control means 300 renews the connection control table 600 and the receiver Control table 700 as described later.

Figure 8:
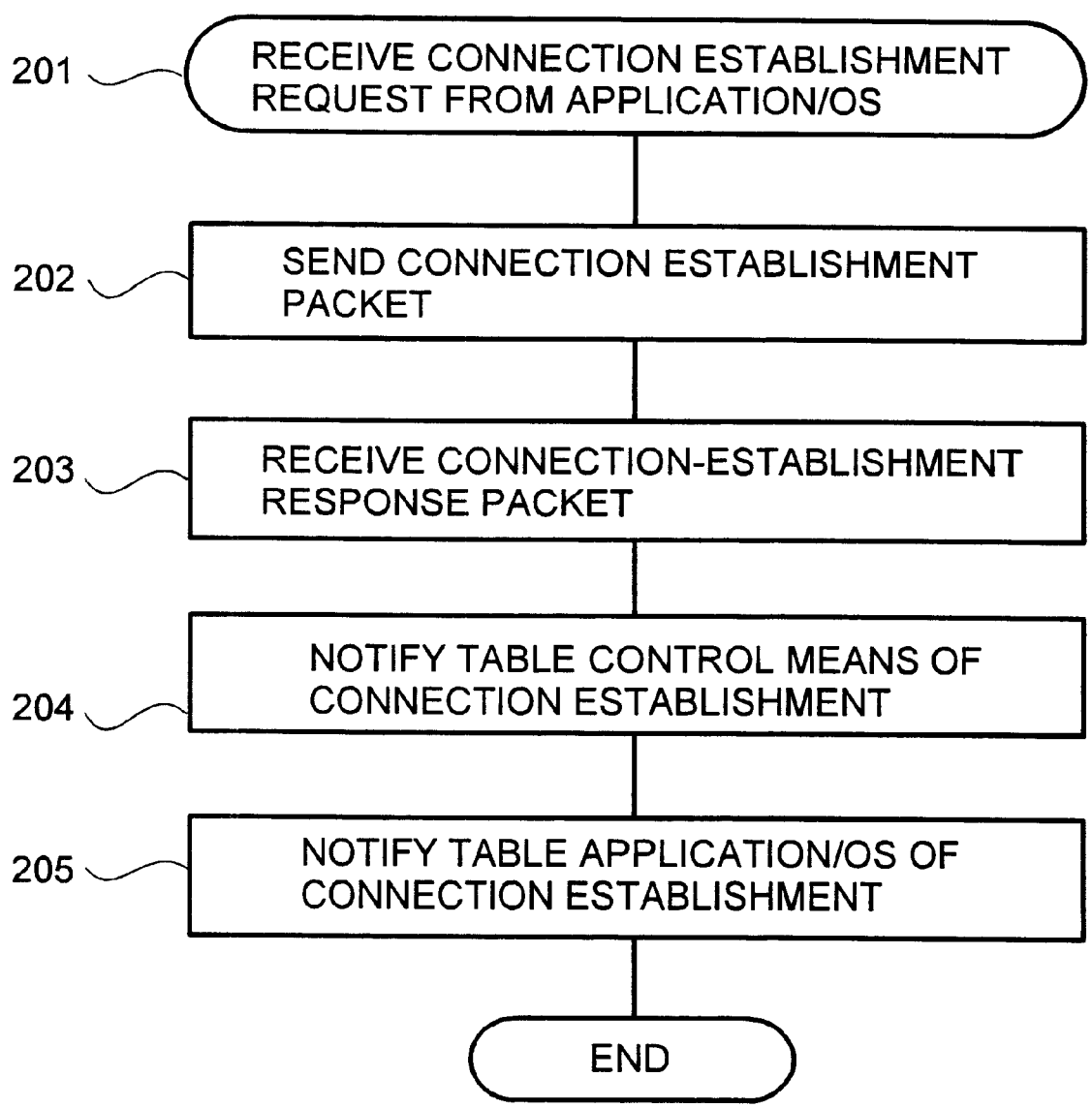
FIG. 8 is a flowchart in the case when the connection control means receives a connection establishment request from an application program or the operating system.

FIGS. 8, 9, 10, and 11 are flowcharts indicating the processing procedure of the connection control means 200. FIG. 8 is a flowchart for the case when the connection control means 200 receives a connection establishment request from an application program or the operating system. When the connection control means 200 receives a connection establishment request from an application program or the operating system (Step 201), it sends out a connection establishment packet to the computer to which the connection is requested to be made (Step 202). Then, when the connection control means 200 receives a response to the connection establishment packet from the computer (Step 203), it notifies the table control means 300 of the establishment of a connection (step 204). The connection control means 200 also notifies the application program or the operating system program, as the case may be, of the establishment of a connection (Step 205) and finishes the processing.

Figure 9:
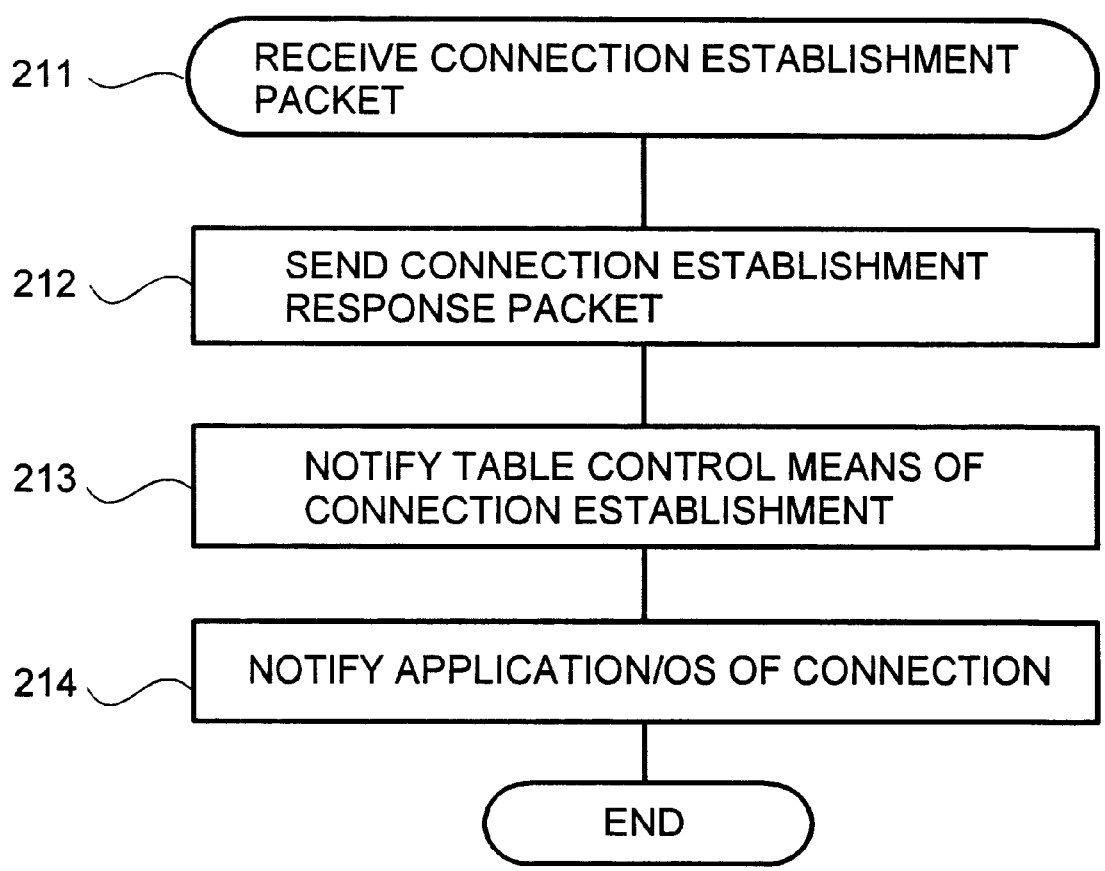
FIG. 9 is a flowchart in the case when the connection control means receives a connection establishment request from another computer.

FIG. 9 is a flowchart for the case when the connection control means 200 receives a connection establishment request from another computer. When the connection control means 200 receives a connection-establishment request packet from another computer (Step 211), it sends out a connection-establishment response packet to the computer (Step 212). Then, the connection control means 200 notifies the table control means 300 of the establishment of a connection (Step 213). The connection control means 200 also notifies an application program or the operating system program of the establishment of a connection (Step 214) and finishes the processing.

Figure 10:
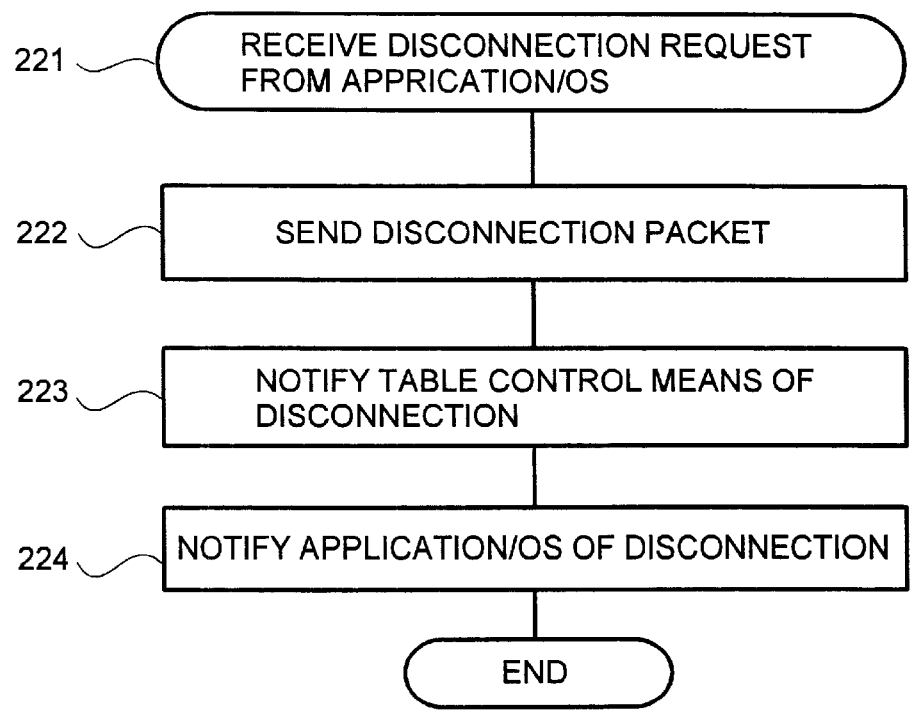
FIG. 10 is a flowchart in the case when the connection control means receives a disconnection request from an application program or the operating system.

FIG. 10 is a flowchart in the case when the connection control means 200 receives a disconnection request from an application program or the operating system. When the connection control means 200 receives such a disconnection request (Step 221), it sends out a disconnection packet to the computer to which the connection is made (Step 222). Then, the connection control means 200 notifies the table control means 300 of the disconnection (Step 223) and also notifies the application program or the operating system, as the case may be of the disconnection (Step 224) to finish the processing.

Figure 11:
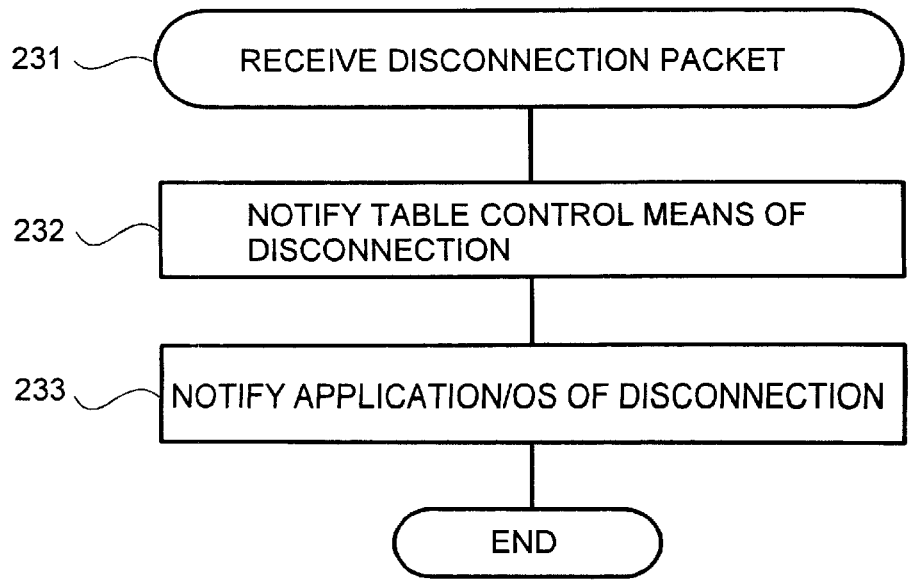
FIG. 11 is a flowchart in the case when the connection control means receives a disconnection request from the computer to which the connection is made.

FIG. 11 is a flowchart in the case when the connection control means 200 receives a disconnection request from the computer to which the connection is made. When the connection control means 200 receives a disconnection request packet from the computer to which the connection is made (Step 231), it notifies the table control means 300 of the disconnection (Step 232). Then, the connection control means 200 notifies an application program or the operating system of the disconnection (Step 233) and finishes the processing.

Figure 12:
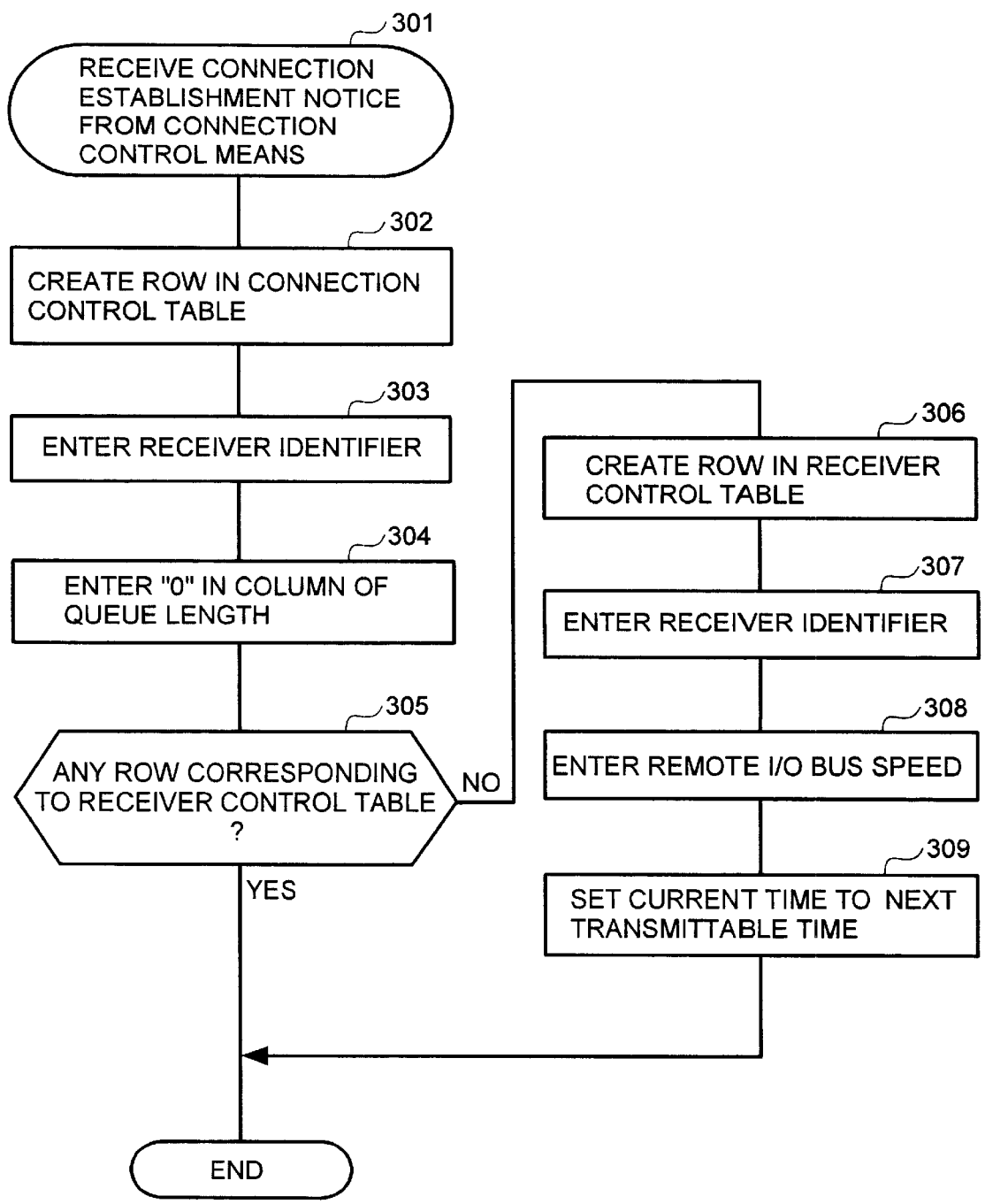
FIG. 12 is a flowchart showing the processing procedure in the case when the table control means receives a notice of a connection established from the connection control means.
Figure 13:
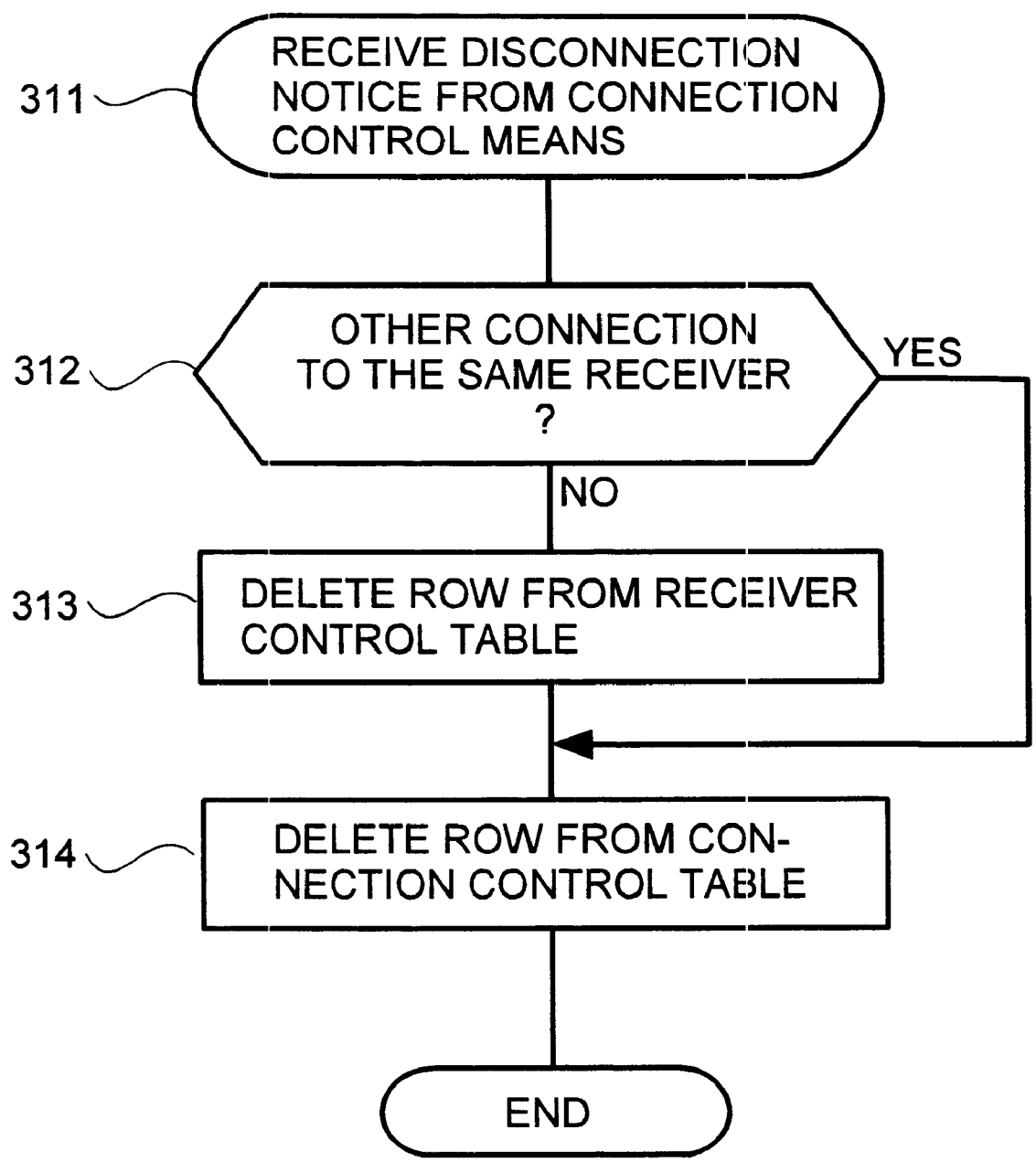
FIG. 13 is a flowchart showing the processing procedure in the case when the table control means receives a notice of disconnection from the connection control means.
Figure 14:
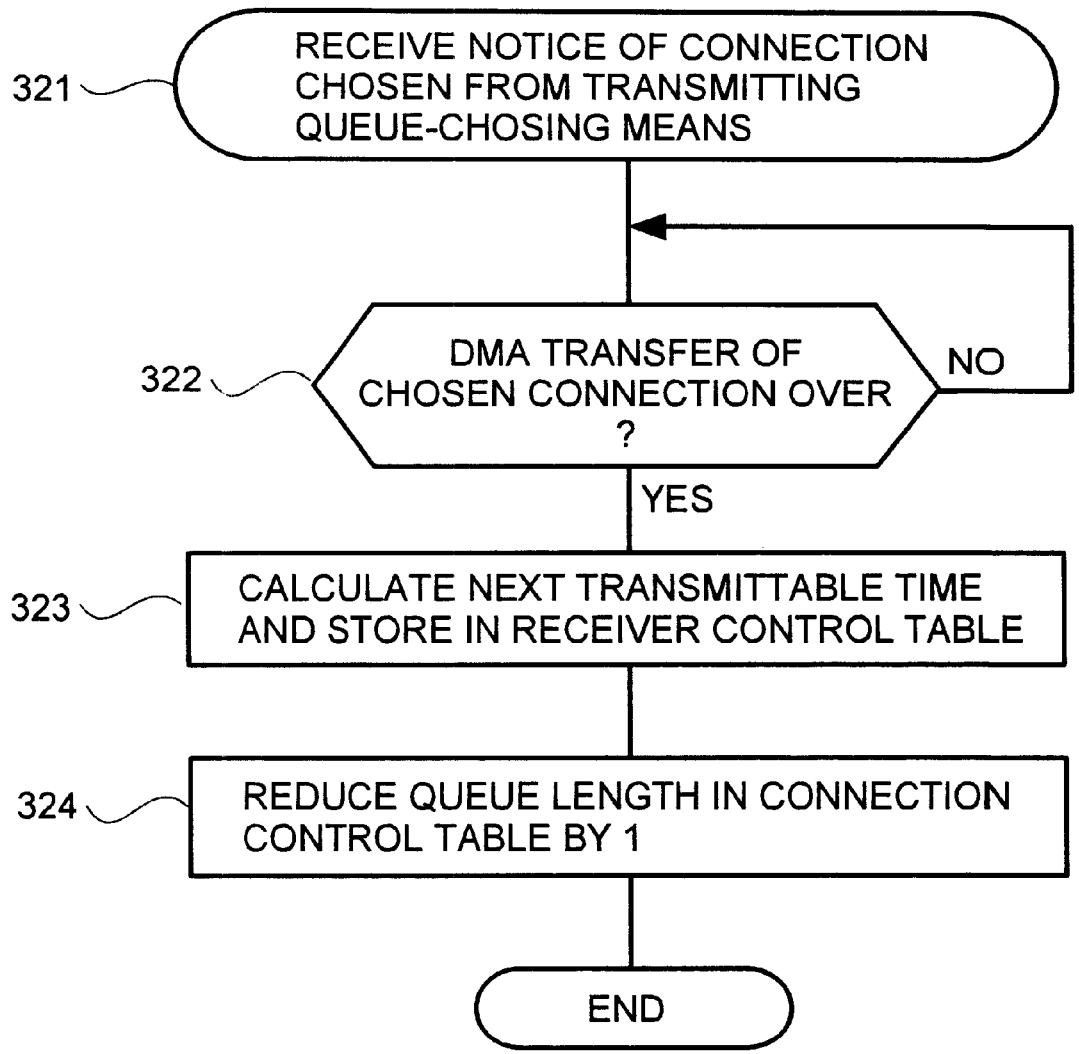
FIG. 14 is an illustration showing the Processing procedure in case that the table control means receives a notice of a connection chosen from the transmitting queue-choosing means.

FIGS. 12, 13, and 14 are flowcharts indicating the processing procedure of the table control means 300. FIG. 12 shows the processing procedure in the case when the table control means 300 receives a notice of a connection established from the connection control means 200. When the table control means 300 receives a notice of a connection established from the connection control means 200 (Step 301), it creates a row for a new connection in the connection control table 600 (Step 302). Then, the table control means 300 enters the value of the receiver identifier corresponding to the notified connection into the section belonging to the created row and the column of receiver identifiers 602 (Step 303) and also enters "0" into the section belonging to the created row and the column of queue length 603 (Step 304).

Then, referring to the column of receiver identifiers 701 of the receiver control table 700, the table control means 300 checks to see whether or not there is a row corresponding the receiver of the notified connection in the receiver control table 700 (Step 305). If there is a row corresponding to the receiver of the notified connection, the table control means 300 finishes the processing. If there is no row corresponding to the receiver of the notified connection, the table control means 300 creates a row for a new receiver in the receiver control table 700 (Step 306) The table control means 300 enters the value of the receiver corresponding to the notified connection into the section belonging to the created row and the column of receiver identifiers 701 (Step 307), and also enters the transfer rate of the I/O bus, to which the receiver is connected, into the section belonging to the created row and the column of I/O bus speeds 702 (Step 308). The table control means 300 also enters the current time into the section belonging to the created row and the column of next transmittable times 703 (Step 309) and finishes the processing.

FIG. 13 shows the processing procedure in the case when the table control means 300 receives a notice of disconnection from the connection control means 200. When the table control means 300 receives such a notice of disconnection 200 (Step 311), it checks the receiver identifiers 602 in the connection control table 600 to see that whether or not there are connections which have the same receiver as the broken connection (Step 312). If there are connections having the same receiver as the broken connection, the table control means 300 deletes the row of the broken connection form the connection control table 600 (Step 314) and finishes the processing. If there is no connection having the same receiver as the broken connection, the table control means 300 deletes the row corresponding the receiver of the notified connection from the receiver control table 700 (step 313) and also deletes the row of the broken connection from the connection control table 600 (Step 314) to finishes the processing.

FIG. 14 shows the processing procedure in case that the table control means 300 receives a notice of a connection chosen from the transmitting queue-choosing means 400. When the table control means 300 receives such a notice of a connection 400 (Step 321), it checks to see whether or not the DMA control unit 530 has finished transferring the data of the chosen connection from the transmitting queue in the memory 130 to the transmitting and receiving buffer 540 (Step 322). If the transfer has not been finished yet, the table control means 300 repeats the checkup of Step 322 until the transfer is finished. When the transfer has been finished, the table control means 300 calculates the next transmittable time, enters the time into the section belonging to the row corresponding to the chosen, or notified, connection and the column of next transmittable times 703 in the receiver control table 700 (Step 323), subtracts 1 from the value in the section belonging to the row of the chosen, or notified connection and the column of queue length 603 (Step 324), and finishes the processing.

3. Calculation of Next Transmittable Time

The method by which the table control means 300 calculates the next transmittable time shown in the receiver control table 700 is next described. FIG. 15 shows an example of the calculating method. In the first place, the table control means 300 calculates the minimum transmission interval from the maximum data length, the transfer rate of the I/O bus to which a communication control device on the transmission side is connected, and the transfer rate of the I/O bus to which the communication control device on the reception side is connected (Equation 330). The maximum data length is determined by the network through which computers communicate with each other. Then, the table control means 300 adds the minimum transmission interval to the current time to find the next transmittable time (Equation 331).

As is shown in FIG. 15, the minimum transmission interval is determined from the maximum data length, the transfer rate of the I/O bus to which a communication control on the transmission side is connected, and the transfer rate of the I/O bus to which a communication control device on the reception side is connected, and it is constant while the connection between the communication control devices is maintained. Therefore, by calculating the minimum transmission interval when connection between two communication control devices is established, the calculation of the next transmittable time after each time of data transmission can be made simpler and the processing by the table control means 300 can be made faster.

Figures 16, 17:
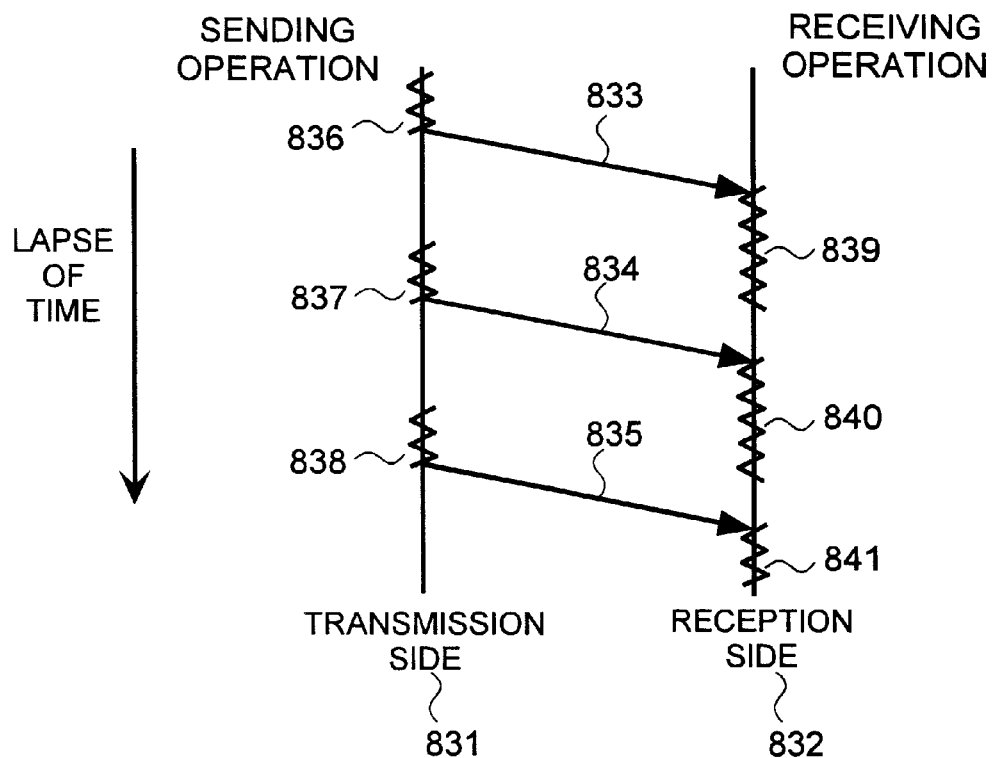
FIG. 16 is an illustration showing an example of the receiver control table which is designed to raise the speed of the table control means in calculating the next transmittable time.
FIG. 17 is an illustration showing the transmitting and receiving operation in the case when the length of data packets is relatively short.

Another embodiment of the present invention for faster calculation of the next transmittable time will now be described. FIG. 16 shows an example of the receiver control table 700 which is designed to raise the speed of the table control means 300 in calculating the next transmittable time. The receiver control table 700 has a column of minimum transmission intervals 712 instead of the column of I/O bus speeds 702. The minimum transmission interval can be expressed in terms of time, number of time slots, operating clock frequency, and so on. When a connection is established, the table control means 300 creates the column of minimum transmission intervals 712 and enters the minimum transmission interval of the connection in the column. The table control means 300 adds the minimum transmission interval to the current time to find the next transmittable time (Step 323 of FIG. 14).

In accordance with the method of calculating the next transmittable time shown in FIG. 15, the communication efficiency cannot be raised high enough because there necessarily occur time periods for which the communication control device on the reception side is idle. This problem can be solved by using another method: the transmission interval is determined from the transfer rate of the I/O bus to which the communication control device on the reception side is connected and the length of data to be transmitted. The time necessary to transfer data from the communication control device 150 to the memory through the I/O bus 161 in the computer 110 or 111 on the reception side depends upon the length of data to be transferred. The method described below enables inserting, between a data packet and the next data packet to be transmitted, an interval which corresponds to the time necessary for a computer on the reception side to transfer the former data packet to its memory, and thereby more efficient transmission can be accomplished.

FIG. 17 illustrates the operation in the case of data of short length. In accordance with the method described earlier, the minimum transmission interval is calculated from the maximum data length, the transfer rate of the I/O bus to which a communication control device on the transmission side is connected, and the transfer rate of the I/O bus to which a communication control device on the reception side is connected. Therefore, only if data packets of the maximum length are successively transmitted with the minimum transmission intervals between them, the communication control device on the reception side can processes received data packets continuously, or without idle time. In FIG. 17 the transmission side 831 transmits a data packet 833 after processing the same for transmission (836) transmits another data packet 834 after processing the same for transmission (837) and transmits a still another data packet 835 after processing the same for transmission (838) The reception side 832 receives the data packet 833 to process (839), receives the data packet 834 to process (840), and receives the data packet 835 to process (841). If the data packets are relatively short, idle times occur between processing 839 and processing 840 and between processing 840 and processing 841.

As described below, another embodiment of the calculation method in accordance with the present invention enables eliminating such idle times and accomplishes communication high efficiency even when the data length varies. FIG. 18 shows the method by which the table control means 300 calculates the next transmittable time with data of different lengths to achieve high-efficiency communication. The table control means 300 finds the multiplier from the transfer rate of the I/O bus to which a communication control device on the transmission side is connected and the transfer rate of the I/O bus to which a communication control device on the reception side is connected (Equation 340). Then, the table control means 300 adds the product of the data length multiplied by the multiplier to the current time to find the next transmittable time (Equation 341). Thus, because transmission intervals are determined based on data length, there is no idle time on the reception side even when data of relatively short lengths are transmitted successively from the transmission side. Hence, high communication efficiency can be achieved.

In another embodiment for choosing connections evenly in accordance with the processing procedure of the transmitting queue-choosing means 400, some connection(s) may seldom be chosen when two or more connections have one and the same receiver identifier. In the example of the connection control table 600 shown in FIG. 4, connections "2," "4," and "5" have the same receiver identifier "2." When data are transmitted from connection "4," the table control means 300 enters the next transmittable time into the column 703 of the receiver control table 700. Then, the transmitting queue-choosing means 400 chooses connection "5," but connection "5" has the same receiver identifier "2" as connection "4." Accordingly, the checkup (next transmittable time≧current time) at Step 405 of FIG. 7 may result in "No," prohibiting data transmission from connection "5." Thereafter, when connection "4" is chosen after data are transmitted from connection "3," the checkup (next transmittable time≧current time) at Step 405 of FIG. 7 results in "Yes" and data are transmitted from connection "4" again. Then, connection S is chosen, but the checkup (next transmittable time≧current time) at Step 405 of FIG. 7 may again result in "No," prohibiting data transmission from connection "5." In this way, if there are two or more connections with one and the same receiver identifier, some connection(s) may not be able to transmit data.

To solve the above problem, another embodiment of the present invention will now be described. FIG. 19 shows another embodiment of the connection control table of the present invention, which is designed for choice of connections. This connection control table 620 is the connection control table 600 with a column for next connection 624 added.

FIG. 20 shows another embodiment of the receiver control table of the present invention, which is designed for choice of connections. This receiver control table 720 is the receiver control table 700 with a column for next connection 724 added. In accordance with this embodiment, a connection list for each receiver identifier is made from the connection control table 620 of FIG. 19 and the receiver control table 720 of FIG. 20. For example, as the connections "2," "4," and "5" have the same receiver identifier "2" in the connection control table 620, one list is made for the connections "2," "4," and "5." This list indicates the order of transmission and may be configured as follows. In the row of the receiver identifier "2" in the receiver control table 720, "2" is held in the column of next connection 724. In the row of the connection "2" in the connection control table 620, "5" is held in the column of next connection 624. In the row of the connection "5" in the connection control table 620, "4" is held in the column of next connection 624. In the row of the connection "4" in the connection control table 620, "End" is held in the column of next connection 624. In this way, a list indicating the order of "2 to 5 to 4" is made.

Figure 21:
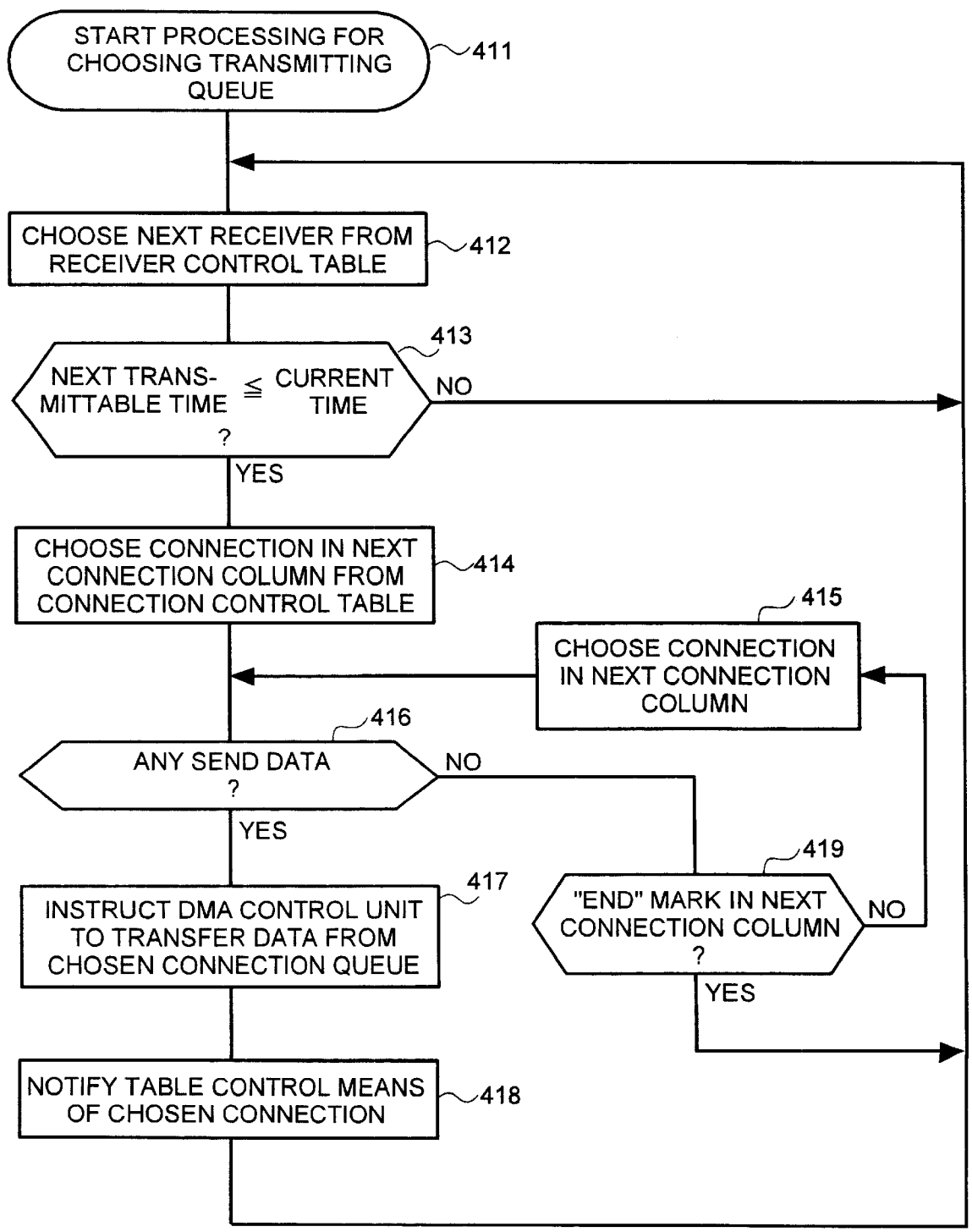
FIG. 21 is a flowchart showing another embodiment of processing procedure of the transmitting queue-choosing means for choosing connections evenly.

FIG. 21 is the flowchart showing another embodiment of the processing procedure of the transmitting queue-choosing means 400 for choosing connections evenly. After power to the communication control device 150 is turned on, the transmitting queue-choosing means 400 starts processing for choosing a transmitting queue (Step 411). Referring to the column of receiver identifiers 701 of the receiver control table 720, the transmitting queue-choosing means 400 chooses a connection. The choice may be made as follows. If a receiver (receiver identifier) is already chosen in the receiver control table 720, the transmitting queue-choosing means 400 chooses the next receiver in the receiver control table 720. If the receiver identifier "1" is currently chosen in the receiver control table 720, the transmitting queue-choosing means 400 chooses the receiver identifier "2." In FIG. 20, if the receiver identifier "3" is currently chosen, the transmitting queue-choosing means 400 chooses the receiver identifier "1." If no receiver (receiver identifier) is currently chosen in the receiver control table 720, the transmitting queue-choosing means 400 chooses the first receiver in the receiver control table 720 (Step 412).

After choosing a receiver, the transmitting queue-choosing means 400 acquires the next transmittable time in the section belonging to the row of the chosen receiver and the column 703 in the receiver control table 720, and checks to see whether the current time has passed the next transmittable time or not (Step 413). If not, the transmitting queue-choosing means 400 determines that the data cannot be transmitted to the chosen receiver, and returns to Step 412 to choose the next receiver. If the current time has passed the next transmittable time, the transmitting queue-choosing means 400 acquires the next connection number in the section belonging to the row of the chosen receiver and the column 724, and chooses the connection corresponding to the next connection number in the connection control table 620 (Step 414).

After choosing the connection, the transmitting queue-choosing means 400 checks to see whether the transmitting queue corresponding to the chosen connection has data or not (Step 416). This check can be accomplished by, for example, referring to the queue length of the transmitting queue in the column 603. If the transmitting queue has no data, the transmitting queue-choosing means 400 acquires the next connection number, or code, in the section belonging to the row of the chosen connection and the column 624 in the connection control table 620, and checks to see whether the next connection number, or code, is "End" or not (Step 419). If it is "End," meaning that the currently chosen connection is the last one corresponding to the chosen receiver, the transmitting queue-choosing means 400 returns to Step 412 and chooses the next receiver. If the next connection number, or code, is not "End," the transmitting queue-choosing means 400 chooses the connection corresponding to the next connection number (Step 415). Until it encounters a connection having data to be transmitted or a connection having "End" in the next connection column, the transmitting queue-choosing means 400 repeats Steps 416, 419 and 415.

On the other hand, if the transmitting queue corresponding to the chosen connection has data to be transmitted, the transmitting queue-choosing means 400 instructs the DMA control unit 530 to transmit the data from the transmitting queue of the chosen connection (Step 417) The transmitting queue-choosing means 400 notifies the table control means 300 of the chosen connection (Step 418) and returns to Step 412 to choose the next receiver.

Figure 22:
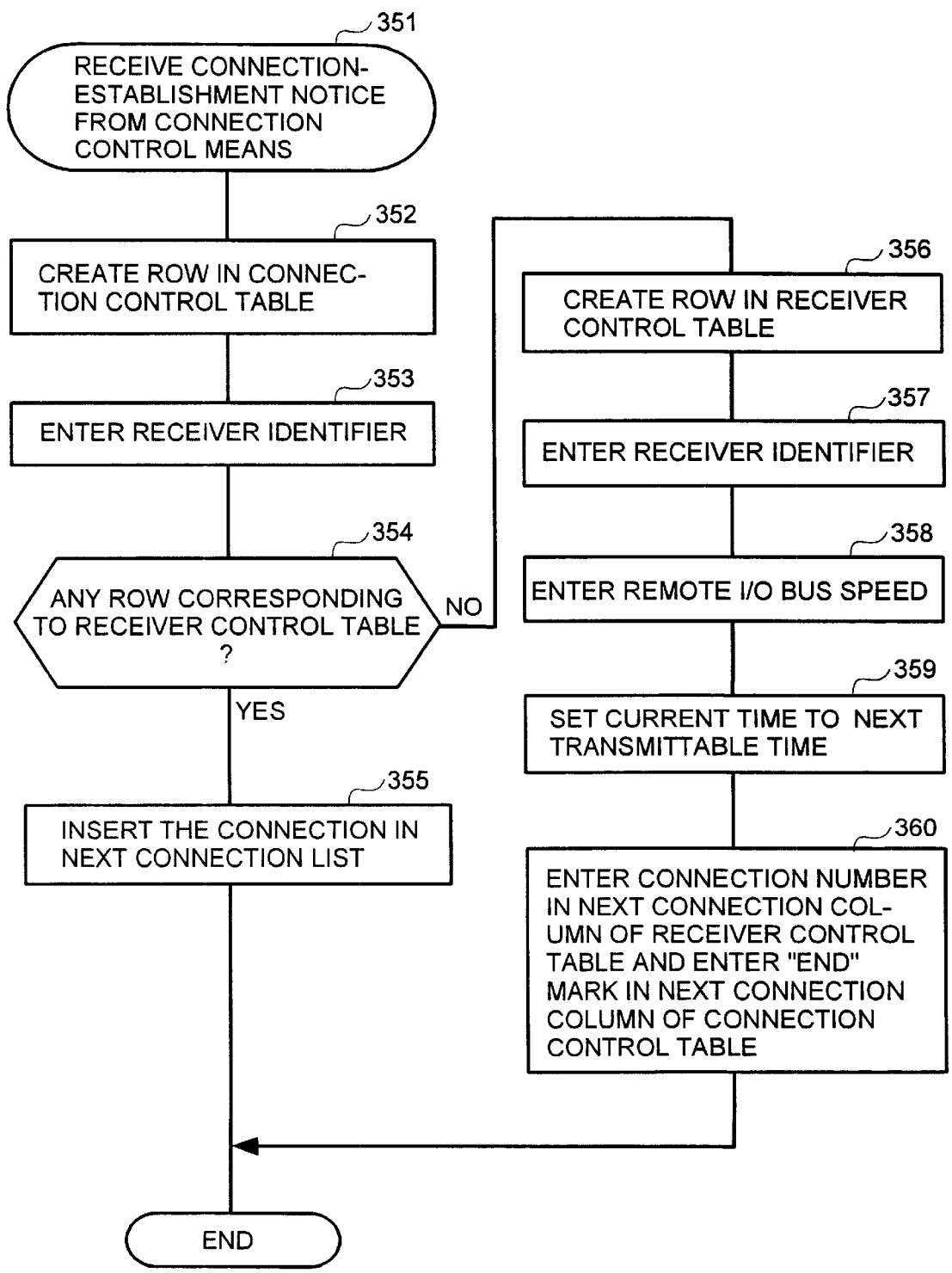
FIG. 22 is a flowchart showing the processing procedure for choosing connections evenly in the case when the table control means receives a notice of a connection established from the connection control means.
Figure 23:
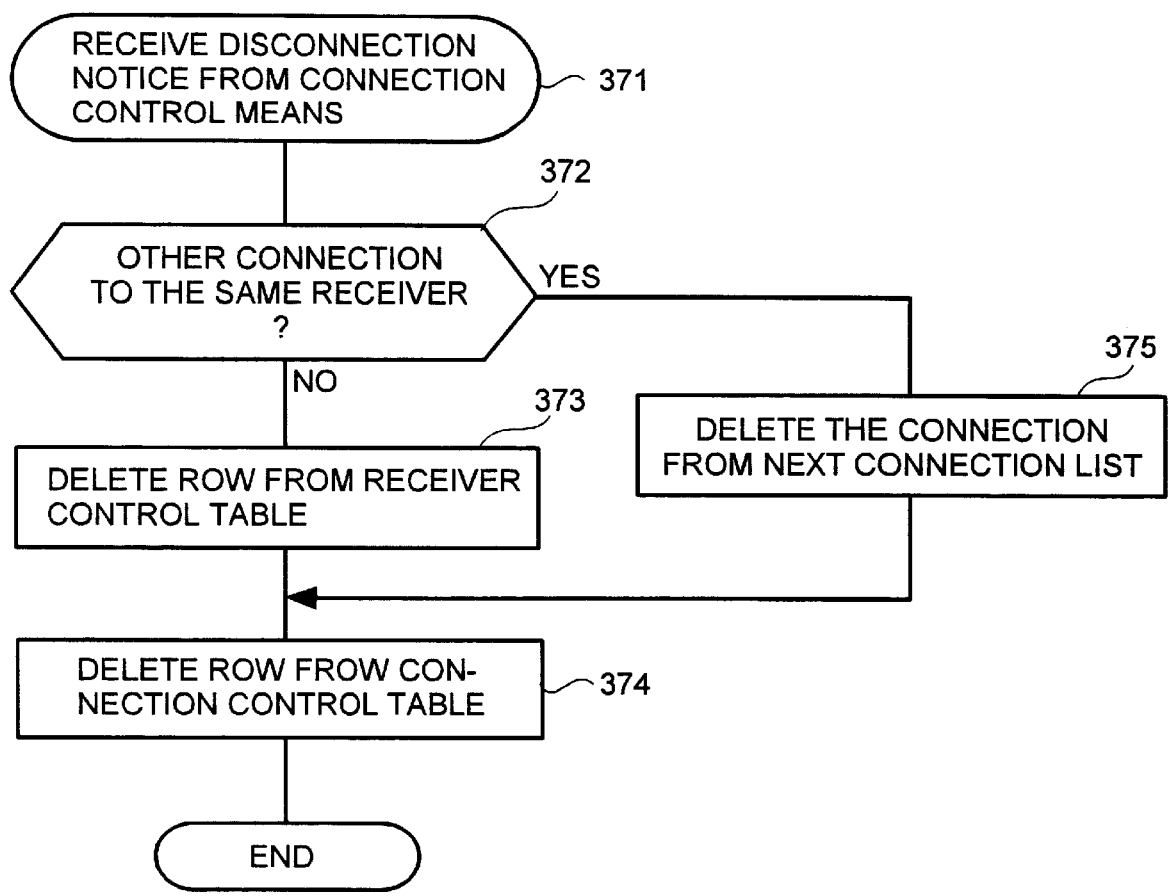
FIG. 23 is a flowchart showing the processing procedure for choosing connections evenly in the case when the table control means receives a notice of the connection broken from the connection control means.

FIGS. 22, 23, and 24 are flowcharts showing another embodiment of processing procedure of the table control means 300 for choosing connections evenly. FIG. 22 is a flowchart showing the processing procedure for choosing connections evenly in case that the table control means 300 receives a notice of a connection established from the connection control means 200. When the table control means 300 receives a notice of a connection established (Step 351), it creates a row for the new, or notified, connection in the connection control table 620 (Step 352). Then the table control means 300 enters the value of the receiver identifier corresponding to the notified connection into the section belonging to the created row and the column of receiver identifiers 602 (Step 353). Next the table control means 300 checks to see whether the row corresponding to the receiver of the notified connection exists in the receiver control table 720 (Step 354). If the row corresponding to the receiver of the notified connection exists in the receiver control table 720, the table control means 300 renews the columns of next connections 624 and 724 in the connection control table 620 and the receiver control table 720 so that the notified connection is inserted into the list of the connections which correspond to the receiver (Step 355). Then, the table control means 300 finishes the processing.

On the other hand, if the row corresponding to the receiver of the notified connection does not exist in the receiver control table 720, the table control means 300 creates a row for the new receiver in the receiver control table 720 (Step 356). The table control means 300 enters the value of the receiver identifier corresponding to the notified connection into the section belonging to the created row and the column 701 (Step 357), enters the transfer rate of the I/O bus to which the receiver is connected into the section belonging to the created row and the column 702 (Step 358), and enters the current time into the section belonging to the created row and the column of next transmittable times 703 (Step 359). The table control means 300 enters the notified connection number into the section belonging to the created row and the column of next connection 724 in the receiver control table 720, and enters "End" into the section belonging to the created row and the column of next connection 624 in the connection control table 620, thereby creating a list of the connections which correspond to the receiver (Step 360). Then, the table control means 300 finishes the processing.

At Step 355, the notified connection may be entered into the lists as follows. For example, in the connection control table 620 of FIG. 19 and the receiver control table 720 of FIG. 20, a list of the connection order of "2 to 5 to 4" is made for the receiver identifier "2." It is assumed here, as an example, that the notified connection number is "6" and its corresponding receiver identifier is "2." In this case, the table control means 300 changes the value from "2" to "4" in the section belonging to the row of the receiver identifier "2" and the column of next connection 724 in the receiver control table 720. The table control means 300 creates a row for the connection "6" in the connection control table 620. and enters "2" into the section belonging to the created row and the column of next connection 624. Thus, the list of the connection order for the receiver identifier "2" is changed, the new order being "6 to 2 to 4 to 5."

FIG. 23 is a flowchart showing the processing procedure for choosing connections evenly in the case when the table control means 300 receives a notice of a broken connection from the connection control means 200. When the table control means 300 receives a notice of a broken connection (Step 371), the connection control table 620 checks to see whether or not there are connections which have the same receiver identifier as the broken connection (Step 372). If there are, the table control means 300 renews the columns of next connection in the connection control table 620 and the receiver control table 720 so that the notified connection is deleted from the list of the connections which correspond to the receiver (Step 375). Also, the table control means 300 deletes the row of the notified connection from the connection control table 620 (Step 374) and finishes the processing.

If there is no connection which has the same receiver identifier as the broken, or notified, connection, the table control means 300 deletes the row of the receiver identifier corresponding to the notified connection from the receiver control table 720 (Step 373), and also deletes the row of the notified connection from the connection control table 620 (Step 374). It then finishes the processing.

At Step 375, the notified connection may be deleted from the list as follows. In the connection control table 620 of FIG. 19 and the receiver control table 720 of FIG. 20, a list of the connection order of "2 to 5 to 4" is made for the receiver identifier "2." If the notified connection number is "5," the table control means 300 changes the value from "5" to "4" in the section belonging to the row of connection "2" and the column of next connection 624 in the connection control table 620, thereby changing the connection order list for the receiver identifier "2," which now specifies the connection order of "2 to 4." If the notified connection number is "2," the table control means 300 changes the value from "2" to "5" in the section belonging to the row of the receiver identifier "2" and the column of next connection 724 in the receiver control table 720, thereby changing the connection order list for the receiver identifier "2," which now specifies the order of "5 to 4."

FIG. 24 is a flowchart showing the processing procedure for choosing connections evenly in the case when the table control means 300 receives a notice of a connection chosen from the transmitting queue-choosing means 400. When the table control means 300 receives a notice of a connection chosen from the transmitting queue-choosing means 400 (Step 381), it checks to see whether or not the DMA control unit 530 has finished transferring the data of the chosen connection from the transmitting queue in the memory 130 to the transmitting and receiving buffer 540 (Step 382). If the transfer has not been yet finished, the table control means 300 repeats the check of Step 382 until the transfer is finished. When the transfer is finished, the table control means 300 calculates the next transmittable time, enters the time in the section belonging to the row corresponding to the notified connection and the column of next transmittable times 703 in the receiver control table 720 (Step 383), and subtracts "1" from the value in the section belonging to the row of the notified connection and the column of queue length 603 in the connection control table 620 (step 384). Then, the table control means 300 renews the columns of next connection in the connection control table 620 and the receiver control table 720 so that the notified connection is moved to the bottom of the list of the connections which correspond to the receiver identifier (Step 385) and finishes the processing.

At Step 385, for example, the notified connection is moved to the bottom of the list as follows, In the connection control table 620 of FIG. 19 and the receiver control table 720 of FIG. 20, a list of the connection order of "2 to 5 to 4" is made for the receiver identifier "2." If the notified connection number is "5," for example, the table control means 300 changes the value from "5" to "4" in the section belonging to the row of connection "2" and the column of next connection 624 in the connection control table 620, the value from "End" to "5" in the section belonging to the row of connection "4" and the column of next connection 624, and the value from "4" to "End" in the section belonging to the row of connection "5" and the column of the next connection. Thus, the table control means 300 changes the connecting order list for the receiver identifier "2," which now specifies the order of "2 to 4 to 5."

Also, if the notified connection number is "2," for example, the table control means 300 changes the value from "2" to "5" in the section belonging to the row of connection "2" and the column of next connection 724 in the receiver control table 720. Further, the table control means 300 changes the value from "End" to "2" in the section belonging to the row of connection "4" and the column of next connection 624 in the connection control table 620, and the value from "5" to "End" in the section belonging to the row of connection "2" and the column of next connection 624. Thus, the table control means 300 changes the connecting order list for the receiver identifier "2," which now specifies the order of "5 to 4 to 2."

Further, the above list may be stored as necessary, independently from the connection control table 620 and the receiver control table 720, or may form a chain configuration between data of the rows by adding data indicating the next address connection number, etc. of the list to the data of each row.

Though the situation when the I/O buses of computers are bottlenecks of the transfer rate has been described above, the present invention is also applicable to situations when other proper internal buses become bottlenecks. Furthermore, the present invention can be applied to the circumstances when the processing speed at which a processor and so on calculate control data such as a checksum concerning the presence or absence of errors, etc., and a speed at which reading from and writing to a memory is done are bottlenecks. In such cases, instead of the internal bus speed, data concerning the minimum transmission interval, data concerning a time period required for transmitting unit length data, or data concerning transfer rates such as a processing speed of a processor on the reception side may be stored as necessary. Also, when choosing connections evenly, data are not limited to the bus speed on the reception side and proper data described above can be also used. Further, a transmitting timing may be calculated using proper data concerning a transfer speed, etc. other than data directly becoming bottlenecks.

The communication control device connected to the internal bus of the computer has been particularly described above. However, communication control devices are not limited to the ones installed in the computer, and the present invention is applicable to proper devices such as communication control devices provided inside or outside of devices other than computers. Also, when devices such as a plurality of communication control devices, computers and so on are provided in internal buses such as an I/O bus provided in a device of a given network address, the present invention can be applied by specifying a receiver identifier of the device.

The preceding has been a description of the preferred embodiment of the invention. It will be appreciated that deviations and modifications can be made without departing from the scope of the invention, which is defined by the appended claims.

What is claimed is:

1. A communication control device comprising:
 a connection control table which stores connection numbers for communication between the communication control device and other communication control devices and stores data including receiver identifiers of the other communication control devices;
 a receiver control table which stores data including receiver identifiers of the other communication control devices and next transmittable times;
 a connection control means which, upon the establishment of connection with one of the other communication control devices, receives, from the other communication control devices, a connection establishment response which includes at least one internal bus speed of the communication control device;
 a table control means which receives a notice of establishment of a connection from the connection control means, records data in the connection control table, and further records the data including the internal bus speed received by the connection control means into the receiver control table if the receiver control table has no data corresponding to the receiver identifier of the communication control device; and
 a transmitting queue-choosing means which chooses the connection number and the receiver identifier of the next connection from the connection control table made by the table control means, acquires the next transmittable time for the chosen receiver identifier from the receiver control table made by the table control means, compares the acquired next transmittable time and the current time, and chooses a transmittable queue for storing data to be transmitted in accordance with the result of the comparison.

2. A communication control device according to claim 1, wherein the receiver control table stores data for at least one of internal bus speeds, a minimum transmission interval, a time period required for transmitting unit length data, and transfer rates.

3. A communication control device according to claim 2, wherein the minimum transmission interval is determined by a maximum data length, a transfer rate of an I/O bus to which the communication control device is connected, and a transfer rate of an I/O bus to which the communication control device on the reception side is connected.

4. A communication control device according to claim 1, wherein the table control means further creates, by the connection control table and the receiver control table, a list showing an order of connections to be chosen for each receiver identifier, and the transmitting-queue choosing means sequentially chooses a plurality of connections for each receiver identifier according to the created list.

5. A communication control device according to claim 1 further comprising a control unit assessing a transfer rate of an I/O bus to which a receiving communication control device to receive data is connected and controlling the operation of delaying data transfer to the receiving communication control device a prescribed time period and putting an interval between the transmission of a data packet and the transmission of a next packet according to the transfer rate.

6. A communication control device according to claim 1 further comprising a control unit assessing a transfer rate of an I/O bus to which a receiving communication control device is connected and controlling the operation of delaying data transfer to the communication control device and putting an interval, being determined by the length of the former packet, between the transmission of a data packet and the transmission of next packet according to the transfer rate.

* * * * *